United States Patent

[11] 3,604,792

| [72] | Inventor | Charles Woodruff<br>New York, N.Y. |
|---|---|---|
| [21] | Appl. No. | 797,123 |
| [22] | Filed | Feb. 6, 1969 |
| [45] | Patented | Sept. 14, 1971 |
| [73] | Assignee | Visual Instruction System, Inc.<br>New York, N.Y. |

[54] SINGLE FRAME CINEMATIC PROJECTOR
10 Claims, 4 Drawing Figs.

[52] U.S. Cl. ................................................ 352/169
[51] Int. Cl. ........................................... G03b 21/38
[50] Field of Search .......................................... 352/169,
137, 174, 176, 177; 353/59

[56] References Cited
UNITED STATES PATENTS

| 1,352,420 | 9/1920 | Albers | 352/169 |
|---|---|---|---|
| 1,732,755 | 10/1929 | Kerestes | 352/169 |
| 3,145,614 | 8/1964 | Royston | 352/169 |
| 3,489,492 | 1/1970 | Kobler | 352/169 |

FOREIGN PATENTS

| 747,661 | 12/1966 | Canada | 352/169 |
|---|---|---|---|

Primary Examiner—Louis R. Prince
Assistant Examiner—Denis E. Corr
Attorney—Hubbell, Cohen & Stiefel ABSTRACT: A drive motor for a motion picture projector is normally connected to the shutter mechanism thereof by means of a clutch which is spring-biased to the engaged position, but a solenoid disengages the clutch after a single frame advance. A pair of switches, one manual and the other cam operated, are arranged so that the solenoid is normally deenergized, causing the clutch to be normally engaged and the shutter mechanism to be normally operative. But a cam driven by the shutter shaft transfers one of the switches so as to stop the film advance precisely at a frame display point, thus freezing a single frame on the screen. The manual switch may then be momentarily operated so as to open the circuit of the solenoid, allowing the shutter mechanism to advance through one frame cycle. At the conclusion of that cycle, the next operation of the cam switch restores those conditions which reenergize the solenoid, disengage the clutch, and thus cause the projector to stop and freeze the next frame. Thus the projector can be advanced one frame for each operation of the manual switch. A third switch converts the projector to the continuous frame mode by holding the clutch solenoid circuit continuously open. A cooling fan is operable from the motor drive shaft and is independent of the clutch, so that cooling continues during stop motion operation.

PATENTED SEP 14 1971          3,604,792
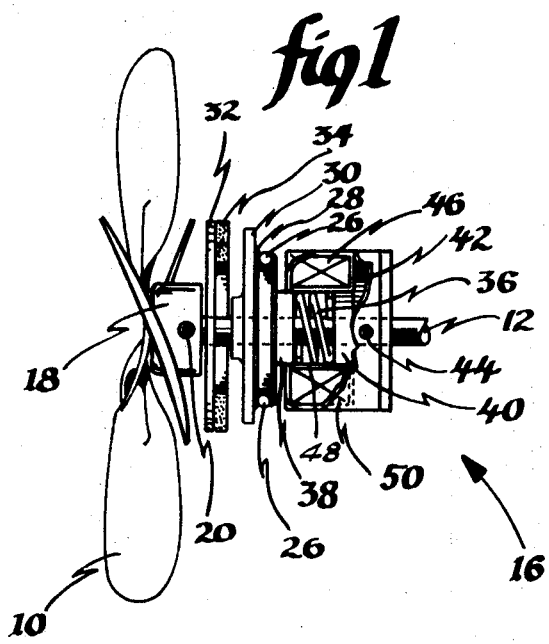
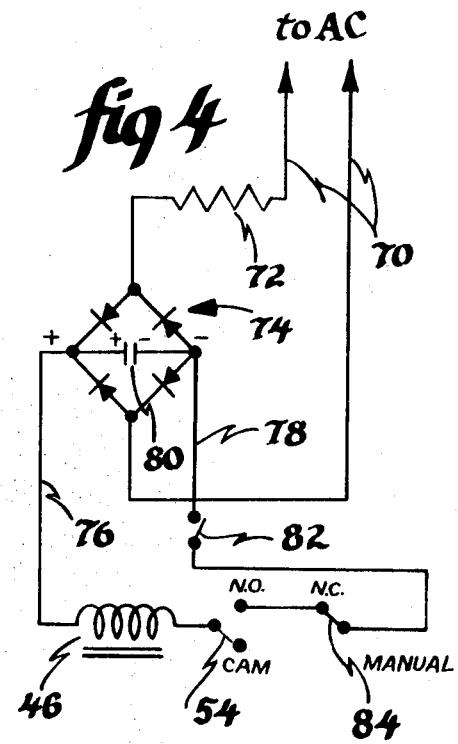
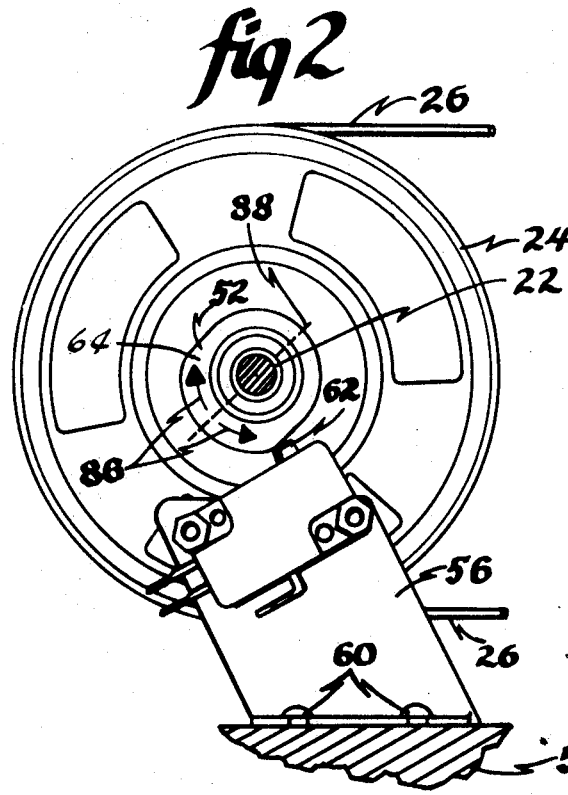
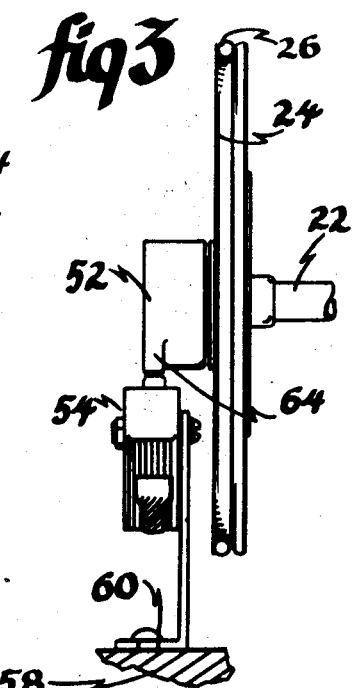
INVENTOR.
CHARLES WOODRUFF
BY
Hubbell, Cohen & Stiefel

SINGLE FRAME CINEMATIC PROJECTOR

FIELD OF THE INVENTION

This invention relates to cinematic projectors, and is particularly concerned with a single frame stop motion mechanism therefore.

THE PRIOR ART

There are a number of previous movie film projectors which are capable of stopping the film for continuous projection of a single frame; but these mechanisms are subject to several operating deficiencies. One such device stops the advance of the film by turning off the film drive motor. Since the cooling fan is usually driven by the same motor, this approach has the disadvantage of turning off the cooling fan when the film is stopped. This would be undesirable in any circumstances, since the heat dissipated by cinematic projection lamps normally calls for some cooling assistance. But the need for cooling assistance is even greater when operating in the stop frame mode, because the projection lamp is then directed indefinitely at a single segment of the film strip. This has a tendency to cause "popping" of the film, i.e. buckling, swelling and burning.

Another prior art approach to the problem of stop frame projection involves the use of an auxiliary motor, solenoid or other actuator, the sole function of which is to step the film a single frame at a time. This approach also has several disadvantages. For one thing, it increases the cost and complexity of the projector, due to the fact that two independent drive mechanisms are required, one for continuous advance and the other for single frame. Another disadvantage resides in the fact that the auxiliary stop frame actuator has a tendency to interfere with reverse projection of the film, i.e. continuous motion in the backward direction. If the film does not stop precisely in the right place during the last frame of single frame operation, the auxiliary (or single frame) drive mechanism might not fully disengage from from the film sprockets. Subsequently, when the continuous frame drive motor is started in the reverse direction, the sprocket engaging means of the single frame mechanism might fail to retract, and would then tear the film as it moved rearwardly. In addition, such auxiliary stop motion drive mechanisms are frequently inaccurate, and consequently do not stop the film precisely at a frame display point. This results in frequent dark frames during single frame operation, and intensifies the tearing problem in connection with subsequent reverse projection.

Finally, these prior art approaches are not capable of reverse direction single frame operation.

SUMMARY AND OBJECTS OF THE INVENTION

Broadly stated, the object of this invention is to provide an improved cinematic stop frame projection mechanism. In more specific terms, the invention aims at providing a single frame capability without sacrificing the cooling assistance of a fan. Another objective is to prevent overheating and popping of the film. Another is to provide a single frame mechanism which does not duplicate the film drive mechanism, and does not increase the cost or complexity of the projector. Still another object is to eliminate the problem of film tearing when single frame operation is followed by continuous frame operation in the reverse direction. It is also an object to eliminate all auxiliary sprocket engaging mechanisms. A further object is to eliminate the problem of inaccurate positioning of the film during stop frame operation. An additional object is to avoid dark frames when operating in the single frame mode. Another object is to provide a single frame mechanism which works equally well in the reverse direction.

In carrying out the invention, there is provided a film-advancing and shutter-operating mechanism, a cam, and a switch operated by the cam. The cam is connected to the film and shutter mechanism so as to operate the switch at each film frame display point. There is a clutch for driving the film and shutter mechanism, which is biased to an engaged position so that the drive train is normally complete. However an electrically controlled actuator is operative to disengage the clutch, and a circuit connects that actuator to the switch so that cam operation of the switch causes the clutch to be disengaged, terminating the advance of the film at the frame display point. This arrangement enables the fan to be operated continuously from the drive motor, even during stop frame operation. Various manual switches are connected in the energizing circuit for the clutch actuator so that the film can be released one frame or several frames at a time, or the stop frame circuit can be disabled entirely so as to confine the projector to normal continuous frame operation.

BRIEF DESCRIPTION OF THE DRAWINGS

FIG. 1 is a side elevational view, with parts broken away and sectioned for clarity of illustration, of the clutch and fan mechanism of the cinematic projector of this invention;

FIG. 2 is a front elevational view of the film drive pulley and cam operated switch mechanism of the same projector;

FIG. 3 is a front elevational view of the mechanism of FIG. 2; and

FIG. 4 is a schematic diagram of the electrical circuit for energizing the clutch solenoid of FIG. 1.

The same reference characters refer to the same elements throughout the several views of the drawing.

DETAILED DESCRIPTION OF THE PREFERRED EMBODIMENT

The projector of this invention comprises a single drive motor (which is entirely conventional and therefore need not be shown) to provide power for both forward and reverse continuous frame film transport, for single frame film advance, and also for continuous operation of a cooling fan 10. The motor accomplishes this by means of a drive shaft 12 and a clutch mechanism generally designated 16. The blades of the cooling fan 10 are joined to a common hub 18 which is secured by means of a set screw 20 to the outer end of the shaft 12, so that the cooling fan 10 operates continuously so long as the projector motor turns the shaft.

But the film advance and shutter operating mechanism of this projector (which also is entirely conventional and need not by shown) is operated only intermittently from the drive shaft 12, depending upon the position of the clutch 16 which may be disengaged to stop the film. The driven shaft 22 (see FIGS. 2 and 3) is the one which drives the film and shutter mechanism. This shaft is actuated by a driven pulley 24 in response to a a drive belt 26. The belt in turn is powered by a pulley 28 surrounding the drive shaft 12. The pulley 28 is loose on the shaft 12 so as to be rotatable thereabout. But a driven clutch plate 30 is secured to the pulley 28, and is capable of being engaged with or disengaged from a driving clutch plate 32 which is fixed upon the shaft 12 for rotation therewith. An annular friction facing material 34, which may be cork or any other suitable material, is secured to the driving clutch plate 32 on the side facing the driven plate 30 so as to improve the frictional engagement between these two plates. When driven plate 30 moves to the left as seen in FIG. 1 and engages the friction facing 34 of the driving plate 32, the clutch 16 is engaged, causing pulley 28 to transmit power via belt 26 to the driven pulley 24 and the film and shutter shaft 22.

The clutch 16 is normally kept in its engaged condition by means of a coil spring 36 which loosely surrounds the shaft 12 and operates in compression between a steel hub 38 secured to the pulley 28, and a confronting steel hub 40 which projects from a disc 42 secured to the drive shaft 12 by means of a set screw 44. The effect of the spring 36 is normally to keep the hub 38 and pulley 28 biased to the left as seen in FIG. 1 so that the driven plate 30 engages the cork facing 34 of the driving plate 32. This keeps the clutch 16 normally engaged so that it transmits power via the pulley 28, belt 26 and pulley 24 to the film and shutter shaft 22.

In order to disengage the clutch 16 when necessary for stop frame operation, there is provided a solenoid coil 46 annularly surrounding the drive shaft 12 and secured in place within a steel cylinder 50. The cylinder in turn is secured by means of the set screw 44 to the disc 42. When the solenoid 46 is energized, its flux field is conducted by the cylinder 50, the disc 42 and the hub 40. The hub 38 is then drawn into the interior of the bobbin 48, causing the pulley 28 and the driven plate 30 to be moved to the right as seen in FIG. 1. This separated the driven plate 30 from the cork facing 34 of the driving plate 32, so as to disengage the clutch 16. In performing this disengaging motion, the assembly of the plate 30, pulley 28 and hub 38 slides to the right along the drive shaft 12, and the hub 38 compresses the biasing spring 36. The belt 26 moves slightly to the right with its pulley 28, but this motion is small enough not to disturb the engagement between belt 26 and the driven pulley 24 of FIGS. 2 and 3.

When the clutch coil 46 is energized, the clutch plates 30 and 32 are held apart and the clutch 16 is disengaged So long as the clutch is disengaged in this manner, the pulley 28, drive belt 26, driven pulley 24 and shaft 22 are immobilized. Under those circumstances the film transport and shutter mechanism are stopped. It follows that, in order to achieve single frame projection, the solenoid 46 must be energized at the proper instant to stop the mechanism with the shutter open and a particular frame in position for projection upon a screen.

In order to accomplish this, a cam 52 is secured in place upon the shaft 22, i.e. the shaft which is synchronized with the film transport and shutter mechanism. A sensitive switch 54, preferably of the type known as a microswitch, is mounted adjacent the cam 52 by means of a bracket 56 which in turn is secured to a platform 58 by means of bolts 60. A plunger 62 operated the switch 54 when depressed by a lobe 64 of the cam 52. The driven shaft 22 makes one revolution per film frame cycle of the projector, which is conventional in such equipment, and the cam lobe 64 is angularly positioned upon the shaft 22 so that it depresses the plunger 62 slightly in advance of each frame display point, i.e. just before the point in each operating cycle of shaft 22 when the shutter opens and the next frame of motion picture film is projected upon the screen.

When the plunger 62 is so depressed, it operates the switch 54 so as to energize the clutch solenoid 46, thus disengaging the clutch 16 and disconnecting the mechanical drive to the film and shutter shaft 22. The film and shutter mechanism, along with its shaft 22, then coasts a short distance and comes to a stop. The profile of cam lobe 64 is designed, in relation to the operating delay of switch 54 and the coasting interval of shaft 22, so that the mechanism comes to a stop with the lobe 64 still holding the switch plunger 62 in the depressed position. As a result, the projector stops in such a position that it keeps itself from starting again.

In addition, the profile of cam lobe 64 is so designed that the film and shutter mechanism stops with the shutter open and the next frame displayed upon the screen. In this manner, stop motion operation is achieved by single frame projection.

FIG. 4 shows the electrical circuit for energizing the clutch solenoid 46 at the appropriate moment. The circuit is energized by a pair of AC input lines 70. These lines are connected through a limiting resistor 72 to a conventional diode rectifying bridge 74 which provides full wave DC across a pair of output leads 76 and 78. A capacitor 80 connected across the output terminals of the bridge 74 provides ripple filtering, and also charges up so as to provide a higher initial voltage for the clutch solenoid 46 when it is first energized. Afterwards, the sustaining voltage supplied by the capacitor 80 to the solenoid 46 drops to a lower level.

As with most electromagnetic devices, the force exerted on the armature 38 is weaker at the beginning of the stroke and greater at the end, for a constant solenoid voltage. Accordingly, the differential between the higher initial voltage and the lower holding voltage tends to improve the performance of the solenoid 46 when it is initially energized. This results in a sharper, cleaner clutch disengaging action, which contributes to the precise stoppage of the driven shaft 22 at the desired film frame display point. The sustaining level to which the solenoid voltage falls after initial energization is more than adequate to keep the clutch 16 disengaged once the initial picking operation has been accomplished.

The manner in which the steel hub 38 projects axially from the drive pulley toward the interior of the clutch solenoid 46 also helps to promote rapid response when the solenoid is initially energized to disengage the clutch 16. This also contributes to sharp and precise single frame operation of the projector.

Energization of the solenoid 46 is controlled by three switch: a manually operated defeat switch 82 which is stable in either the open or closed condition, the cam operated microswitch 54 which is shown in its normal condition with its lower contact closed and its upper contact (N.O.) normally open, and a manually operable single frame release switch 84 is shown in its normal condition with its upper contact N.C. is normally closed and its lower contact normally open. The function of the manual defeat switch 82 is to select between continuous frame operation and single frame operation. So long as the switch 82 is open, the solenoid 46 must remain deenergized and the clutch 16 is engaged. Under those circumstances, power is transmitted continuously to the film and shutter shaft 22 while the projector is in operation. Single frame operation can be achieved only when the manual defeat switch 82 is closed, because only then is it possible to energize the clutch solenoid 46 to disengage the clutch 16 and stop the film advance.

The cam operated microswitch 54 is operated to the normally open (N. C.) contact only when the cam lobe 64 depresses the plunger 62. The manual frame release switch 84 is in its normal condition with its N. C. Contact normally closed, and the normally open contact of switch 54 is connected to the normally closed contact of switch 84. As a result, when the cam lobe 64 is not in position to operated the switch plunger 62, the circuit of the clutch solenoid 46 is open. It follows that, whenever film advance is in progress, the projector will continue to drive the film through to the end of a frame cycle until the cam lobe 64 actuates the microswitch plunger 62.

But then when the projector approaches the film frame display point, the cam lobe 64 operates the plunger 62 and operates the microswitch 54 to close its normally open contact. During single frame operation (switch 82 is closed), this closes the circuit to the clutch solenoid 46 and stops the projector in position to display one frame. It then remains in this position, because the now stationary cam 52 holds down the plunger 62 to keep the microswitch 54 transferred, so long as the operator of the projector refrains from moving the manual frame release switch 84, away from its normally closed pole.

During the entire time that a single frame is projected upon the screen, the drive shaft 12 continues to drive the fan 10 for cooling assistance, despite the disengaged condition of the clutch 16. This is of particular importance in a single frame device, where there is no limit to the length of time during which a frame of cinema film can be projected, and thus heated by the projection lamp.

When the operator decides that he wishes to advance to the next frame, still operating in the single frame mode, he momentarily depresses the operating button of the manual frame release switch 84, briefly operating that switch to open its normally closed contact. This opens the circuit to the clutch solenoid 46, despite the fact that the cam lobe 64 is still holding the microswitch 54 closed. As a result, the clutch solenoid 46 is deenergized, allowing the clutch 16 to engage and resume the transmission of power to the film and shutter mechanism, which then embarks upon another frame of film advance. After an instant, the rotation of the film and shutter shaft 22 proceeds far enough to remove the cam lobe 64 from the vicinity of the switch plunger 62, and the normally open contact of 54. Thereafter the clutch solenoid 46 must remain deenergized for the remainder of the film frame cycle, provided the manual frame release switch 84 is released. Accordingly, it is only necessary for the operator to impart a single tap to the manual frame release switch 84. During the instant that switch is open, the cam 52 releases switch 54, and another full cycle of film advance must then be completed even though switch 84 is later released.

When the film advance cycle is completed, the cam 52 again closes the microswitch 54, resulting in another energization normally open contact of the clutch solenoid 46, so that the projector comes to rest in position to display the next frame of motion picture film.

On the other hand, with the normally closed contact of switch 54 open, if the operator chooses, he can hold the manual switch 84 in its operated condition for as long as he likes, thus keeping the clutch solenoid 46 deenergized. In that event the projector will run in the continuous frame mode during the entire interval that the switch 84 is operated. Any desired number of consecutive frames can be projected in this manner, depending upon how long the operator chooses to keep switch 84 open. Upon release of switch 84, however, the projector will again stop on the very next frame display point which comes up after switch release occurs, when the cam 52 opens the switch 54. Any time that the operator wishes to restore the projector to continuous frame operation without holding switch 84 in its operated condition, all that is necessary is to open the manual defeat switch 82, which then overrides the switches 54 and 84 to keep the clutch solenoid 46 continuously deenergized and the clutch 16 continuously engaged so that the projector will not stop.

Single frame operation as described above can be achieved in either direction of rotation of the shaft 22, as indicated by arrows 86 in FIG. 2. This results from the fact that the cam 52 is symmetrical about a center line 88, so that it depresses and releases the switch plunger 62 in the same manner whether it is driven in the direction of forward or reverse film transport. Prior art devices could only drive the film forward, when operating in the single frame mode.

It will now be appreciated that the present invention provides a projector which is capable of either continuous frame or single frame operation, according to the operator's choice and that either mode is compatible with forward or reverse film transport. Thus, not only is there no functional interference between the film reversal and single frame actuation, but the two can even be done simultaneously. Furthermore, the cooling fan operates continuously even though the film transport is stopped for single frame projection, minimizing the film popping problem which is particularly likely to be encountered during prolonged single frame projection. The device also provides the operator with considerable flexibility of control, in that he can either tap the frame release button momentarily to release any number of frames in succession. A third alternative is the complete defeat of the single frame mechanism by means of still another manual switch, which causes the projector to run continuously. When operating in the single frame mode, the projector stops precisely at the frame display point, thus avoiding the problem of dark frames. In addition to avoiding the undue exposure to heat, the film is further preserved by the absence of any special sprocket engaging mechanisms which tend to tear the film.

What is claimed is:

1. Apparatus for advancing and stopping motion picture film having a plurality of film frame display points, said apparatus comprising: a film-advancing and shutter-operating mechanism, camming means, a switch operated by said camming means, means for connecting said camming means to said film and shutter mechanism so that said switch is operated at each film frame display point, means including a clutch for driving said film and shutter mechanism, means biasing said clutch to an engaged position to drive said film and shutter mechanism, electrically controlled means for disengaging said clutch, and a circuit connecting said disengaging means to said switch for actuating said disengaging means upon operation of said switch, whereby to terminate the advance of said film at said frame display point.

2. Apparatus as in claim 1 further comprising means for manually restarting said apparatus after said termination, whereby to advance each frame at will.

3. Apparatus as in claim 2, wherein said cam operated switch is normally open, and is closed by said cam, said manual restarting means comprises a normally closed switch which is manually opened, and said circuit connects both said switches in series with said clutch disengaging means, whereby said cam-operated switch keeps said circuit normally open, said clutch-disengaging means is normally inoperative, said clutch is normally engaged, and said film and shutter mechanism is normally operative between film frame display points, but said mechanism stops at a frame display point when said cam closes said normally open switch whereby to complete said circuit to said clutch disengaging means, then restarts to advance the film at least one frame when manual opening of said normally closed switch reopens said circuit to reengage said clutch.

4. Apparatus as in claim 3 further comprising a third switch in series with the aforesaid switches and said clutch-disengaging means and being manually operable for opening said circuit to override said cam-operated switch and allow said mechanism to run in the continuous frame mode.

5. Apparatus as in claim 2 further comprising manually operable means for interrupting said circuit, whereby to prevent disengagement of said clutch by said switch and thereby cause said film to advance continuously.

6. Apparatus as in claim 1 wherein said disengaging means comprises a solenoid, said circuit being connected to energize said solenoid when said switch is operated, said apparatus further comprising an armature responsive to said solenoid to disengage said clutch.

7. Apparatus as in claim 6 further comprising a drive shaft, a disc on said drive shaft and an annular bobbin on said disc, said solenoid being wound annularly about said bobbin, said clutch comprising a plate which is movable axially on said drive shaft to engage and disengage said clutch, said armature comprising a hub projecting from said movable clutch plate in the direction of disengaging motion thereof and protruding toward the interior of said bobbin to be attracted by said solenoid upon energization, said biasing means comprising a spring received within said bobbin interior and in compression between said disc and said movable clutch plate.

8. Apparatus as in claim 1, further comprising: a continuously rotating drive shaft, cooling means, means for connecting said shaft to said cooling means for continuously driving said cooling means in response to the continuous operation of said shaft, and means for connecting said shaft to said clutch for driving said film-advancing mechanism when said clutch is engaged, whereby said cooling means is operative even during a film stoppage.

9. Apparatus as in claim 8, wherein said clutch comprises a driving plate affixed to said shaft and a driven plate rotatable relative to said shaft but engageable with said driven plate to rotate therewith, and power takeoff means responsive to said driven plate for driving said film-advancing mechanism.

10. Apparatus as in claim 9, wherein said cooling means is a fan blade affixed to said drive shaft, said power takeoff means includes a pulley secured to said driven plate and a drive belt engaging said pulley, said film advancing mechanism comprises a driven shaft and a pulley on said driven shaft engaged by said driven belt, and said camming means is affixed to said driven shaft.